Sept. 15, 1959    B. KRALOWETZ    2,903,783
MILLING CUTTER

Filed May 3, 1955    5 Sheets-Sheet 1

INVENTOR.
BRUNO KRALOWETZ

BY
ATTORNEY

Sept. 15, 1959     B. KRALOWETZ     2,903,783
MILLING CUTTER

Filed May 3, 1955                         5 Sheets-Sheet 2

INVENTOR.
BRUNO KRALOWETZ
BY
ATTORNEY

INVENTOR.
BRUNO KRALOWETZ
BY Robert E. Burns
ATTORNEY

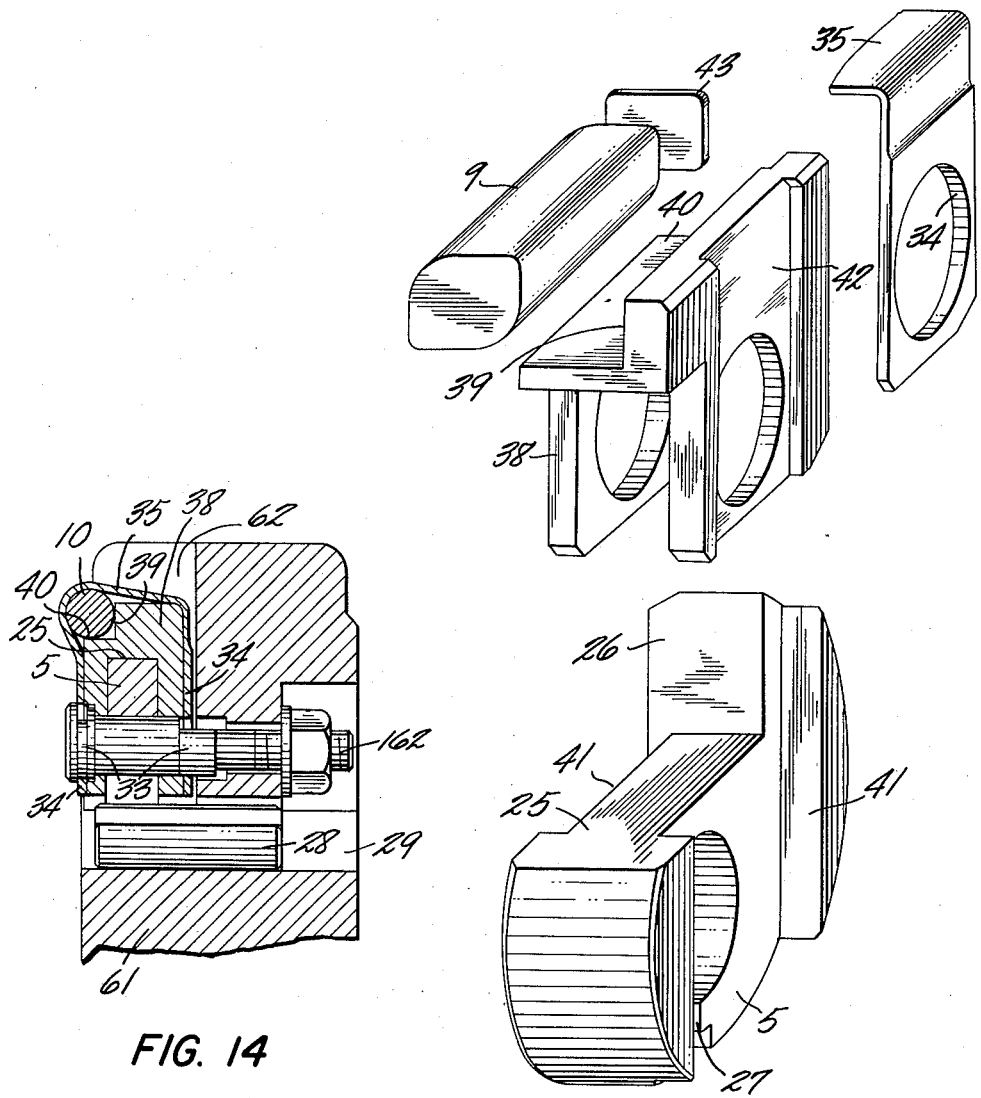

United States Patent Office 2,903,783
Patented Sept. 15, 1959

2,903,783

MILLING CUTTER

Bruno Kralowetz, Steyr, Austria

Application May 3, 1955, Serial No. 505,595

Claims priority, application Austria May 6, 1954

17 Claims. (Cl. 29—105)

Many cutters are known which consist of a cutter head and replaceably and/or adjustably inserted, substantially prismatic or cylindrical teeth of hard alloy, high-speed steel or the like. The teeth have either a form like a lathe tool or are formed as hard alloy disks of circular or polygonal shape. In both cases the teeth are inserted in the cutter head at least approximately in a radial direction and are radially readjusted to compensate for their regrinding. The component profile to be milled by a tooth is determined in the case of lathe-tool-like teeth by the form of their end face in longitudinal section and in the case of disk teeth by the peripheral form of the disk. For this reason that arrangement of teeth in the cutter head has the disadvantage that the original profile must be accurately re-established after each regrinding. This requires special auxiliaries or at least special attention and skill, of course. Whereas a disk tooth can be turned around its axis to make available successive new portions of the peripheral edge as fresh cutting edges, before it must be reground, the disk tooth must be reground at its periphery, i.e. again accurately in the form of a circle or polygon after the entire periphery has become blunt. Another disadvantage of all previously known cutter heads set with replaceable individual teeth resides in the fact that the adjustment of the teeth, i.e. the accurate setting of the cutting edges to the required peripheral circle, is most difficult and time-consuming. Finally, teeth which are radially inserted relative to the cutter head must have a relatively large projection from the cutter head, whereby their safe support by the cutter head is impaired.

It is an object of the invention to eliminate these disadvantages and provide a milling cutter which is suitable for circular milling as well as for face milling or as a profile cutter and whose teeth, separate from the cutter head, can easily be reground merely at the end face, like a thread chaser, and can be gripped in the cutter head with a minimum number of fixing and adjusting means and are supported in the cutter head to the largest extent possible, whereas the replacement and/or readjustment of such teeth requires only a few simple manipulations without need for special gauges or measuring devices.

The essential feature of the invention resides in the fact that the teeth, which cut with an end edge and are to be reground only on the end face, are mounted in guides which extend tangentially or approximately tangentially relative to the periphery of the cutter head in separate tooth holders gripped in the cutter head, and are adjustable in the direction of the longitudinal axis of the tooth or guide. The tooth holder guides thus arranged cause the tooth itself to assume a tangential or approximately tangential position relative to the periphery of the cutter head; this position affords the advantage that the teeth need to be reground only on the end face, without need for observing a certain profile, because different from the radially inserted teeth the required tooth profile is not determined and formed by the form of the end faces but by the cross section of the tooth, which will not vary in the case of a prism or cylinder regardless how much material is removed by grinding on the end face. Moreover, the tangentially arranged teeth can be gripped in the guides in their entire length whereby they are held and supported much more safely than radially supported teeth. Separate tooth holders are provided because the formation of the guides in the cutter head itself is practically impossible or guides formed directly in the cutter head could never be given the dimensional accuracy required to permit of a setting of the teeth only by an adjustment in their longitudinal direction, without need for peripherally regrinding the completely assembled cutter head as a whole. Before the teeth are inserted the guides in the tooth holders gripped in the cutter head are brought to a most accurate measure so that the teeth, also accurately machined at their periphery, need only to be inserted into the guides and their position is accurately determined also after they have been reground; thus the setting work is actually restricted to the longitudinal adjustment of the teeth. An accurate setting of the teeth is necessary particularly where hard alloy teeth are used because they cut only in a depth of about 0.1 to 0.2 mm. The regrinding of the teeth outside of the cutter head, enabled by the construction according to the invention, is of special advantage because it is known by experience that the regrinding of the completely assembled cutter as a whole does not only require special devices but an amount of time which corresponds approximately to the total working time of such cutter until it is reground. Moreover, the cutter heads, often very large in diameter, must be accurately centrically mounted to eliminate wobble and such mounting is difficult and time-consuming. In the milling cutter according to the invention the cutter head may remain in position on the cutter spindle and it is sufficient to replace the individual teeth, which need to be reground only at the end face. Such replacement is possible within a few minutes. Otherwise each regrinding involved the time-consuming and complicated mounting and dismounting of the entire cutter head. These advantages result only from the tangential position of the teeth relative to the periphery of the cutter head and from their gripping in appropriate guides of separate tooth holders.

In a development of the invention the longitudinal axes of the guides include an angle somewhat differing from 90 deg. with the peripheral generatrix of the cutter head and the cutting end edges of the teeth are disposed in a normal plane with respect to the longitudinal axis of the tooth and guide. Owing to that slight inclination of the guides and teeth relative to the generatrix of the cutter head and of the cutting edge of the teeth relative to the workpiece surface the teeth do not impinge on the workpiece with their entire cutting edge at a time, as would be the case if the teeth were arranged normal to the generatrix of the cutter head and the cutting edge was arranged parallel to the generatrix. In the latter case the cut would begin in full width so that the cutting edges would be subjected to heavy impact stresses. In the arrangement according to the invention the teeth penetrate gradually into the workpiece, as in the case of disk teeth, and are subjected, therefore, only to surging loads.

Several illustrative embodiments of the invention are shown in the accompanying drawings, in which Fig. 1 is a diagrammatic side view of a plain milling cutter embodying the invention, Fig. 2 is a diagrammatic top plan view showing a portion of the peripheral zone of a milling cutter as shown in Fig. 1.

Figure 11:
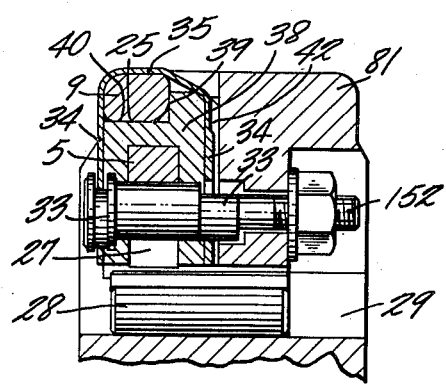
Figure 12:
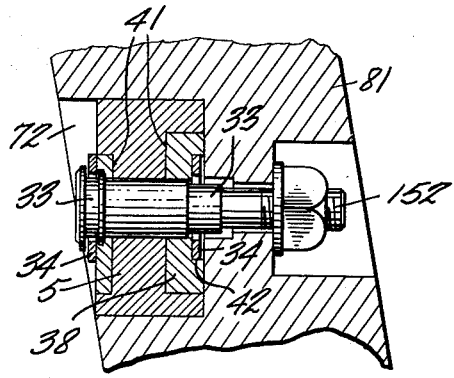
Figure 13:
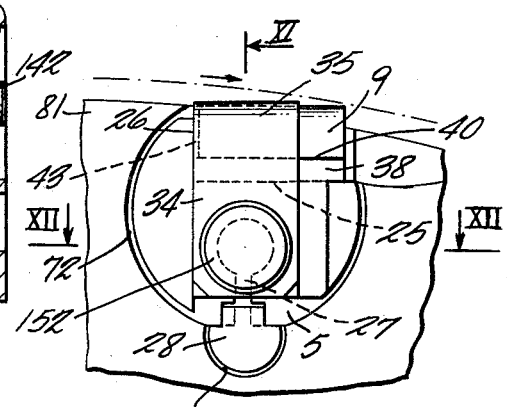

Figs. 11, 12, and 13, respectively, are sectional views taken on lines XI—XI and XII—XII of Fig. 13 and a side view, showing part of a cutter head with tooth holder, attachment, tooth, and steel strip, Fig. 14 is a similar sectional view showing another construction of the cutter, and Fig. 15 is an exploded perspective view showing on a larger scale a tooth holder, attachment, tooth, shim, and fixing strip.

In all figures, like reference numerals identify like parts.

Figure 6:
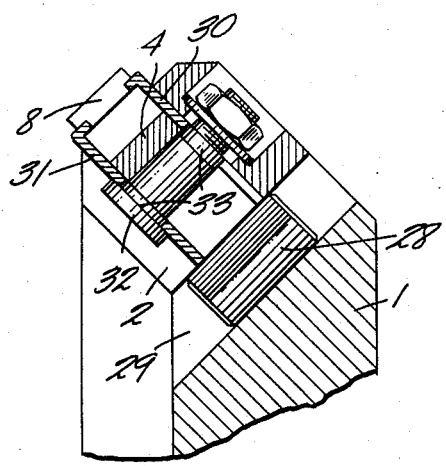
Fig. 6 is an axial sectional view of a face milling cutter having tooth fixing means as shown in Figs. 3 to 5.
Figure 7:
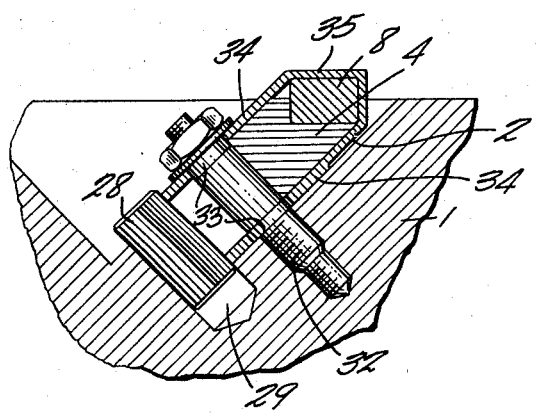
Fig. 7 is an axial sectional view showing the peripheral zone of a wide profile milling cutter.
Figure 8:
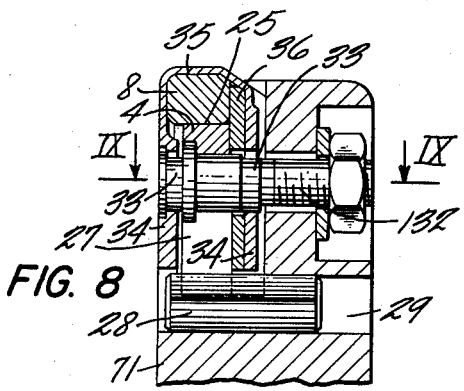
Figs. 8 and 9 are sectional views taken respectively on line VIII—VIII of Fig. 9 and on line IX—IX of Fig. 8 and showing another construction of the tooth fixing means.
Figure 9:
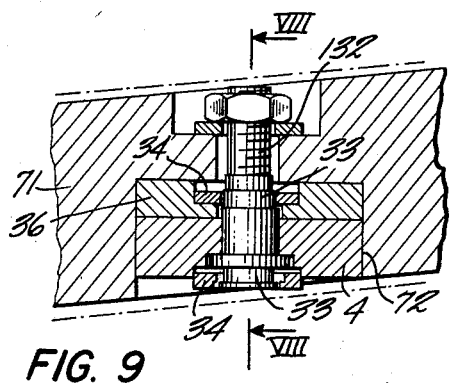

The invention provides a cutter head which is formed in its peripheral zone with bores having a peripherally apertured wall. In Figs. 1 to 5 these bores 2 extend from one end face of the cutter head 1 and substantially parallel to the cutter head axis. The same applies to the bores 52 of the cutter head 51 shown in Fig. 10 and to the bores 62 of the cutter head 61 shown in Fig. 14. In the cutter heads 71 of Figs. 8 and 9, and 81 of Figs 11 to 13, the bores 72 differ to some extent from that direction. In the cutter head 91 of the face milling cutter shown in Fig. 6 the bores 82 extend parallel to the corresponding peripheral generatrix of the cutter head. In the wide cutter head 101 shown in Fig. 7 the bores 92 extend in the intermediate zone from the periphery of the cutter head obliquely with respect to the axis of the cutter head.

Each of these cutter head bores 2, 52, 62, 72 82, and 92 has inserted therein a tooth holder 3 (Fig. 7), or 4 (Figs. 1 to 6, 8 and 9) or 54 (Fig. 10) or 5 (Figs. 11 to 15), which has the form of a circular cylinder and is formed adjacent to the peripheral aperture of the bore wall with a guide for a tooth 8 (Figs. 1 to 10), 9 (Figs. 11 to 13 and 15) or 10 (Fig. 14). This guide extends approximately tangentially with respect to the periphery of the cutter head. This enables the simplest fixation and arrangement of the tooth holders in the cutter head from the manufacturing aspect and renders the guides of the tooth holders accessible from the outside for inserting and readjusting the teeth in spite of the safe fixation of the tooth holders in the cutter head.

The teeth 8 (Figs. 1 to 10) and 9 (Figs. 11 to 13 and 15) are substantially prismatic. The teeth 10 (Fig. 14) are cylindrical. The cross-section of each tooth complements the component profile to be milled by it. For this reason the teeth can be reground simply on the end face without regard to the profile. The end faces of the teeth are normal to the tooth axis or the cutting edges of the teeth lie at least in a normal plane relative to the main axis. The main axes of the teeth include with the peripheral generatrix of the cutter head 1 an angle α differing to some extent from 90 deg. This is exaggerated in Fig. 2.

Unless the cutter head and the profile to be formed is too wide, the cutter head bores extend from one end face of the cutter head parallel to the axis or peripheral generatrices of the cutter head and the tooth holder can simply be inserted from that end face into the cutter head bore. In the case of wide cutter heads, such as the head 101 shown in Fig. 7, bores in the end face with their peripheral apertures can hardly be given the depth required for the teeth and tooth holders in the intermediate range. For this reason the cutter head bores 92 must extend in that case from the cutter head periphery obliquely with respect to the cutter head axis and the generally cylindrical tooth holders 3 must have a corresponding oblique surface adjacent to the peripheral aperture of the bore wall, the guide being formed in said oblique surface.

A simple construction of the tooth holders and teeth and a quick and easy adjustment thereof is achieved if the tooth holders are wedged in the cutter head bores and have by themselves a fixed abutment face 26 for the rear end face of the tooth, so that the teeth can be loosened without requiring the wedging of the tooth holders to be loosened, and replaceable shims 43 can be inserted between the abutment faces and the rear end faces of the teeth, for readjusting the teeth. In accordance therewith the tooth holders accurately positioned during the basic assembly remain always wedged in place so that the abutting face 26 will also remain unchanged in its adjusted position, whether or not the teeth themselves are loosened and removed. Thus the abutting face 26 forms a constant reference plane and it is sufficient to insert a shim 43 to compensate for the reduction in tooth length caused by regrinding. It is obvious that only a conventional vernier caliper is required for measuring the length of tooth whereas such vernier caliper alone is not sufficient in conjunction with the usual setting of teeth and the accurate forward and rearward displacement of the teeth until their cutting edges lie on the desired peripheral circle is not only time-consuming but necessitates the use of special devices. Replaceable shims have been used to compensate the reduction of the tooth length caused by the regrinding of teeth which are inserted and adjustable in a radial direction relative to the cutter head, but this required a particularly high dimensional accuracy because any error in the total length, composed of tooth length and thickness of shim, will cause an equal deviation of the cutting edge from the required peripheral circle. Where the teeth are adjusted according to the invention approximately tangentially relative to the cutter head periphery, any inaccuracies in the direction of the cutter head axis will cause radial deviations only by less than one tenth their magnitude, so that a particularly high precision of machining is not necessary and the accuracy of the vernier caliper is perfectly sufficient.

It is pointed out that the shims 43 shown in the several figures of the drawing are normally not employed with new teeth but are inserted only after the tooth has been reground to compensate the reduction in the length of the tooth caused by the regrinding.

Figure 1:
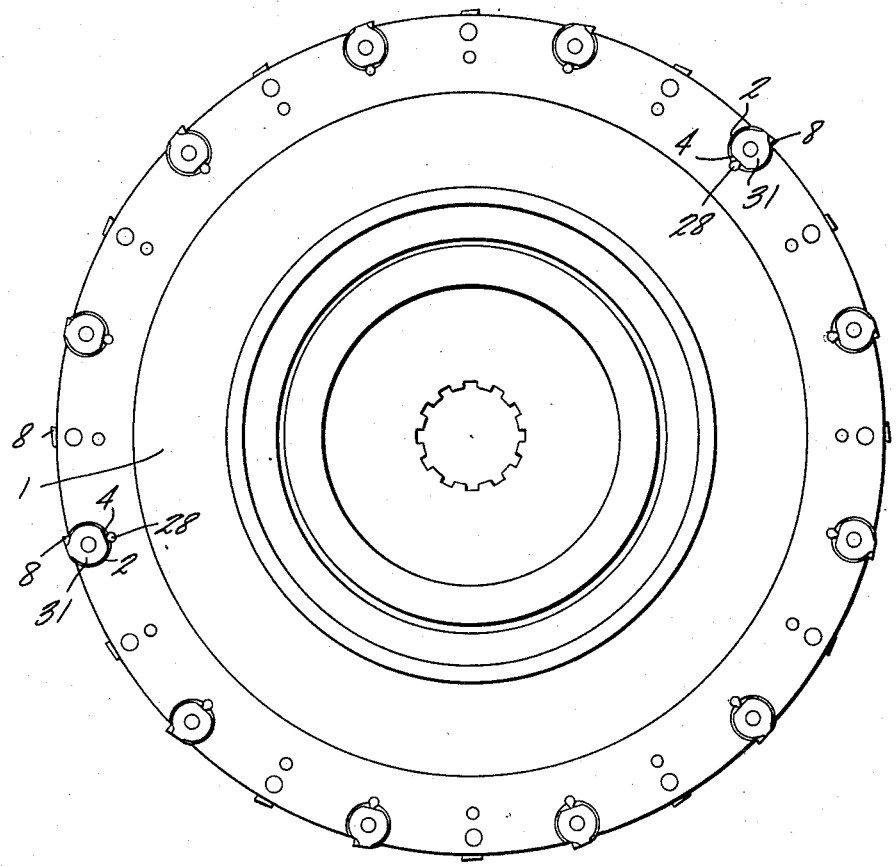
Figure 2:
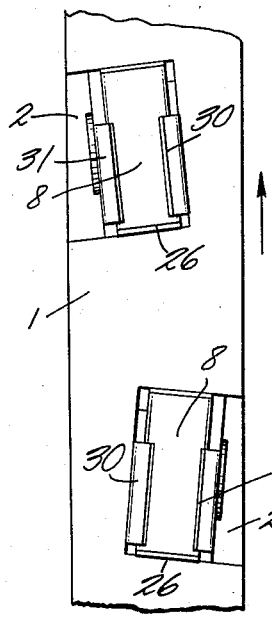
Figure 3:
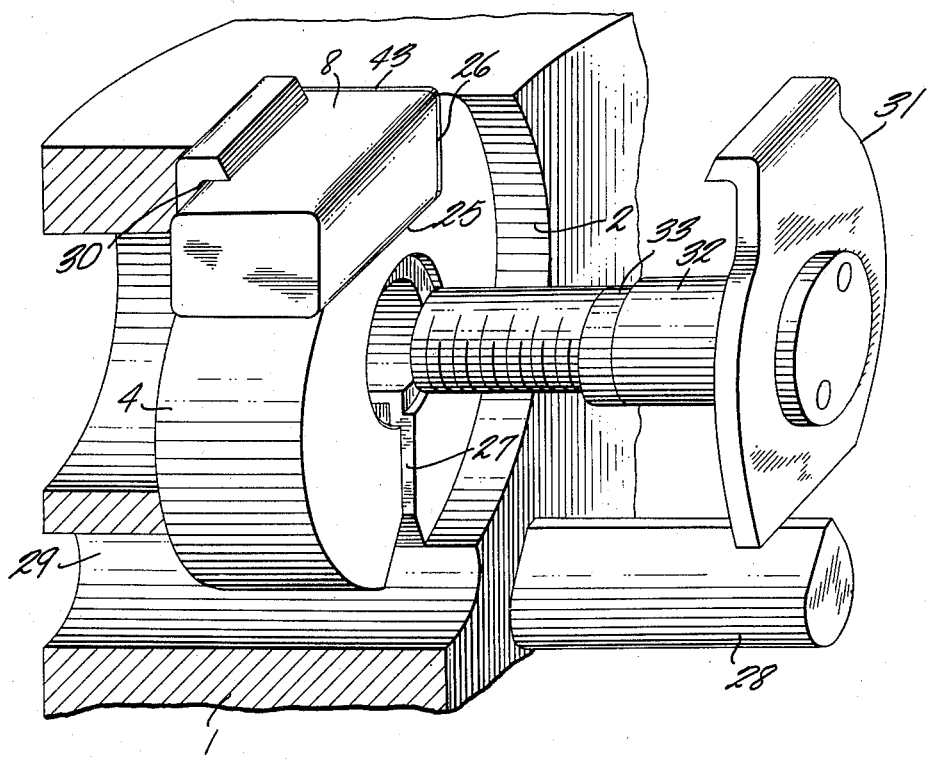
Fig. 3 is a partly sectional perspective view of the peripheral zone of a milling cutter as shown in Fig. 1, Figs. 4 and 5, respectively, are a side view and a sectional view taken on line V—V of Fig. 4, showing the same cutter on a smaller scale than in Fig. 3.
Figure 4:
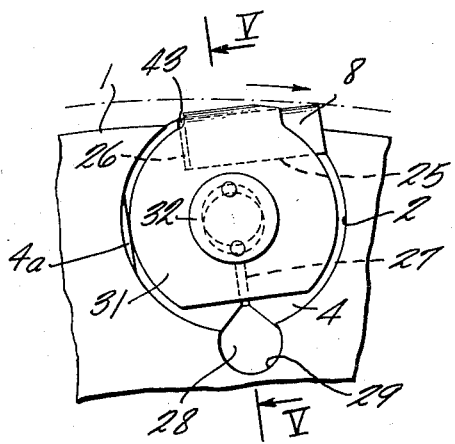
Figure 5:
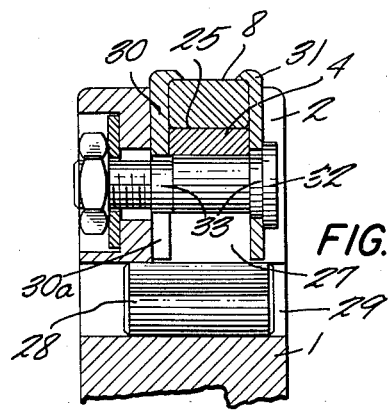

The tooth holders 3, 4, 5 are offset toward the periphery of the cutter head so as to form a supporting face 25 extending approximately tangentially in respect to the periphery of the cutter head and an approximately radial abutting face 26 for the teeth 8, 9 or 10. With reference to Figs. 3 to 5 the tooth holders 4 have a tapered radially and longitudinally extending slot 27 and can be clamped in the cutter head bore 2 by being spread apart by a wedge 28. The wedge 28 has the cross-sectional shape of a semicircle mounting a polygonal figure, such as a triangle, trapezoid or rectangle, and is guided in the cutter head 1 in an additional bore 29 intersecting the cutter head bore 2. During the basic assembly the tooth holder 4 is accurately positioned; then the tooth holder is wedged by that wedge 28 in the cutter head bore 2 and remains perfectly fixed in the cutter head. The wedge 28 inserted in the bore 29 is also employed for fixing the tooth holder in the other embodiments shown in the drawings.

With reference to Figs. 3 to 5, two holding disks 30, 31 extending outwardly over the longitudinal edges of the tooth 8 are arranged in the cutter head bore 2 on both sides of the tooth holder 4. Moreover, a fixing bolt 32 is provided, which can be screw-connected to the cutter head 1 and forces the holding disks 30, 31 against the tooth holder 4 and the end wall of the cutter head bore 2 and is formed with eccentrically turned-off portions 33 engaged by the holes in the disks 30, 31. Owing to these eccentrically turned-off portions 33 the holding disks 30, 31 are pulled down and the tooth 8 is clamped down on the supporting face 25 as the pin 32 is turned. Instead of being integral with the bolt 32, the eccentric portions 33 could be formed on a bushing rotatably mounted on the bolt.

To fix the teeth 8, they are merely applied against the tooth holder 4 and abut against the same at the rear whereas they are held by the holding disks 30, 31. The teeth are forced against the tooth holders 4 by pulling down the holding disks 30, 31, effected by turning the eccentrically turned-off fixing bolt 32 or the sleeve mounted thereon. The fixing bolt 32 forces at the same time the holding disks 30, 31 against the tooth holder 4 and the end face of the cutter head bore 2. When the fixing bolt 32 has been loosened it may either be turned by itself or the bushing mounted thereon may be turned so that the holding disks 30, 31 provide a clearance for the tooth 8 and enable it to be pulled out.

The bores 2 do not extend accurately at right angles with respect to the end face of the cutter head 1 or to the direction of rotation of the cutter head but include therewith an angle differing somewhat from 90 deg. so that the longitudinal direction of the teeth differs somewhat from the direction of rotation and the cutting end edge is slightly inclined relative to the periphery of the workpiece.

The holding disk 30 has a radial slot 30a (Fig. 5).

According to Figs. 8 to 15 the holding disks are formed in a steel strip 35, which is transversely applied over the teeth 8, 9 or 10, as apertured portions 34 of greater thickness than the rest of the strip. Moreover, a side support 36 is provided, which laterally engages the tooth and bears against the end wall of the cutter head bore 52 (Fig. 10) 62 (Figs. 9 and 14) or 72 (Figs. 11 to 13), to prevent a lateral displacement of the tooth and take up lateral forces acting on the tooth. This tooth fixation is particularly suitable for so-called corner teeth, which cut also with one of their lateral end edges. Since such steel strip 35 may be of relatively small thickness it permits of arranging the entire tooth holding means close to the end face of the cutter head. For this reason it is particularly suitable for the fixation of the so-called corner teeth, which cut also with one of their lateral end edges, and specially constructed teeth and tooth holders are not required for that purpose.

Figure 10:
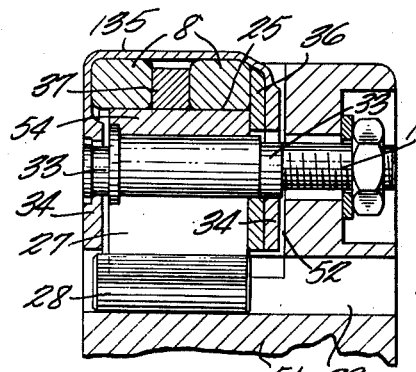
Fig. 10 is a sectional view showing the fixation of double teeth.

As is shown in Fig. 10, a steel strip 135 may be used to hold two teeth 8 on a common tooth holder 54 inserted in the bore 52 of the cutter head 51. The teeth 8 are appropriately spaced by a spacer 37. It is obvious that in this case another pair of teeth must be arranged on the cutter head with such an offset in the direction of its width that the gap between the two teeth of each pair will be machined by the teeth of the other pair. This construction enables the division of a wide cutting edge into two teeth so that in the case of tooth damage it is not necessary to replace a wide tooth but only one of the two narrower teeth needs to be replaced. Whether the teeth are held by holding disks such as 30, 31 or a steel strip such as 35 or two teeth arranged side by side are provided on a common tooth holder such as 54, the cutter construction will afford the additional advantage that the fixation of the teeth does not require them to be formed differently from the simple prismatic shape.

In some cases it is desired to vary the cutter in width, diameter and profile within certain limits to enable the use of the same cutter for forming workpieces or workpiece profiles having relatively slight differences and to eliminate the need for keeping separate cutters in stock for the several forms of workpieces. For instance, there is a multitude of crankshaft types differing only by a variation of their crankpins in length, diameter or transition radius to the adjacent crankwebs by a few millimeters. In spite of the slight differences a multitude of different cutters was required so far for milling those crankpins. The invention eliminates that disadvantage.

This is achieved in the constructions shown in Figs. 11 to 15, in which replaceable attachments 38 for the tooth holders 5 are provided, which form a lateral abutting face 39 and a supporting face 40 for the tooth 9 or 10 whereas they leave free the abutting face 26 of the tooth holder 5 for supporting the tooth in the direction of its longitudinal axis. The attachments 38 are of U-shape and slidably mounted in a straddling position on the tooth holders 5, which are formed on both end faces with recesses 41 corresponding to the limbs of the attachments 38 have a through bore receiving the fixing bolt 152 (Figs. 11 to 13) or 162 (Fig. 14), which like the fixing bolt 132 of Figs. 8 and 9 and the fixing bolt 142 of Fig. 10 is similar in arrangement and function to the fixing bolt 32 of Figs. 1 to 7. The teeth 9 (Figs. 11 to 13 and 15) and 10 (Fig. 14) are held on the attachments 38 also by steel strips 34, 35. For accommodating the steel strip 35, more particularly one of its apertured portions 34, the attachment 38 is formed with a groove-like recess 42 on its side arranged inside the cutter head bore 62 (Fig. 14) or 72 (Figs. 11 to 13). Thus a lateral displacement of the teeth is effected in dependence on the position of the lateral abutting face 39 of the selected attachment. In the case of corner teeth this varies the width of the cutter and the length of the workpiece profile to be milled. The arrangement of the supporting face 40 in the selectable attachment determines the position of the cutting edge of the tooth in the radial direction relative to the cutter head. Thus the replacement of attachments enables, e.g., a variation of the diameter of the workpiece to be formed by circular milling. The position of the lateral abutting face 39 and of the supporting face 40, which can be selected with the different attachments, permits also of varying the tooth cross section so that the profile to be milled, e.g. with different radii of curvature at the transitions between crankpin and crankweb, may also be varied as desired by a replacement at least of the corner teeth. Since the abutting surface 26 of the tooth holders for supporting the tooth in the axial direction is not covered by the attachment 38, the readjustment of the tooth after is length has been reduced by regrinding is possible with the same shims 43 and for the same desired length just as with tooth holders such as 4 (Figs. 3 to 5) having no such attachments as 38.

The mounting of the U-shaped attachments 38 in a straddling position on the tooth holders 5 ensures a safe seating of the attachments 38 on the tooth holders 5. The recesses 41 will avoid a variation of the overall axial length of the tooth holders 5 and an increase in the depth of the cutter head bores 62 (Fig. 14) and 72 (Figs. 11–13) for the tooth holders 5 in spite of the attachments 38. Due to the groovelike recesses 42, no separate fixing means are required for holding the attachments 38 and the axial dimension of the tooth holder 5 is not changed in spite of the laterally applied steel strip 35.

As has been stated the cutting end edges should have a certain inclination relative to the workpiece surface so that the teeth will not impinge on the workpiece with their entire cutting edge at once but penetrate gradually into the workpiece. If the cutting end edges of the teeth lie in a normal plane relative to the main axis of the teeth, whereby the regrinding of the teeth is much facilitated, that inclination requires the tooth axis to include with the peripheral generatrices of the cutter head an angle somewhat different from 90 deg. To this end the tooth abutting faces 26 of the tooth holders could be somewhat inclined relative to the end faces thereof. From the manufacturing aspect it is much simpler, however, if the tooth abutting faces 26 of the tooth holders are normal to the end faces thereof and the axes of the cutter head bores differ somewhat from the direction of the cutter head axis (this applies to bores 2 of Figs. 1 to 5, bores 52 of Fig. 10, bores 62 of Fig. 14, and bores 72 of Figs. 8, 9, and 11 to 13) or the generatrix of the cutter head (this applies to bores 82 of Fig. 6 and bores 92 of Fig. 7).

Preferably the cylindrical peripheral surface of the tooth holder is flattened on one side, as is shown at 4a in Fig. 4, whereby a three-point engagement of the tooth holder in the cutter head bore and thereby a firmer and safer hold of the tooth holder is achieved when the tooth holder is spread apart by the insertion of the wedge.

The edges of the substantially prismatic teeth 8 (Figs. 1 to 10) and 9 (Figs. 11 to 13 and 15) parallel to the axis thereof are rounded or bevelled. That rounding or bevelling of the side edges which are parallel to the tooth axis provides for the required clearance angle at the ends of the cutting end edge if the radius of the rounding or the length of the bevel exceeds the maximum amount of feed of one tooth relative to the tooth immediately preceding in engaging the workpiece.

The teeth 8 (Figs. 1 to 10) are symmetrically shaped with respect to their longitudinal center plane which extends tangentially or approximately tangentially to the cutter head periphery, as well as with respect to the longitudinal center plane normal to the aforesaid one. That bilateral symmetry affords the advantage that each tooth has on each end face two cutting edges, i.e. a total of four cutting edges, and when one edge has become blunt the tooth may be turned by 180 deg. about its longitudinal axis and may be inverted to make fresh cutting edges available. Compared to the previously known lathe-tool-like teeth the number of regrindings of the teeth is reduced to one fourth for otherwise equal conditions. The teeth 9 (Figs. 11 to 13 and 15) cutting also with one of their lateral end edges, i.e. so-called corner teeth, have a cross section of radial symmetry relative to the main axis of the tooth so that these teeth have also four identical cutting edges, which can be successively used for cutting when the tooth is turned and inverted, before the tooth must be reground.

In many cases it is preferable to give the teeth a lip angle differing from 90 deg. to obtain a negative or positive cutting angle. It would hardly be possible to provide such a design in disk teeth because their manufacture and regrinding would become too difficult. In the tooth arrangement and construction according to the invention this is achieved simply by forming the teeth at the ends with symmetrical oblique faces which project or re-enter from the end edges intended for cutting. These oblique faces will not interfere with the accurate regrinding of the tooth and the turning and inverting of the tooth for fourfold use.

From Fig. 14 it is apparent that it is possible without difficulty to depart from the prismatic form of tooth and to use as a corner tooth a cylindrical tooth 10, with a different attachment, of course. Various attachments are provided, in which the lateral abutting face and the supporting face are in different positions and these attachments can be selected to vary the tooth position and the workpiece surface to be formed.

The attachments 38 may be considered tooth holders formed with the tooth guide consisting of the lateral abutting face 39 engaging the tooth on the side thereof which faces inwardly with respect to the direction of the axis of the cutter head, and the supporting face 40 engaging the tooth on the side thereof which faces inwardly with respect to the radial direction of the cutter head. These attachments are detachably fixed on the tooth supporting means 5 carried by the cutter head 2 and formed with abutting faces 26 supporting the inner end face of the teeth. It is apparent that the tooth supporting means 5 may be provided on the cutter head in various ways differing from that illustrated here.

I claim:

1. A milling cutter comprising, in combination, a cutter head formed with bores each of which has a peripheral aperture, tooth holders of basically cylindrical shape and formed with a supporting face, each of said tooth holders being clamped in one of said bores with said supporting face arranged adjacent to the peripheral aperture of said bore and extending substantially tangentially relative to the periphery of the cutter head, and cutting teeth longitudinally adjustably fixed on said supporting faces and projecting therefrom with an end edge arranged for cutting, each of said tooth holders being formed integrally with an abutting face for the end face of the respective cutting tooth opposite to said first-mentioned end face.

2. A milling cutter as set forth in claim 1, in which each of said tooth holders comprises an attachment formed with said supporting face, which engages the respective tooth on the side thereof which faces inwardly with respect to the radial direction of the cutter head, and with a lateral abutting face engaging the tooth on the side thereof which faces inwardly with respect to the direction of the axis of the cutter head, tooth supporting means carried by said cutter head and formed with said abutting face for the said opposite end face of said tooth, said attachments leaving said last-mentioned abutting face exposed for the tooth, and means detachably fixing said attachments on said supporting means and said teeth on said attachments.

3. A milling cutter as set forth in claim 1 in which said tooth holders have a substantially cylindrically shaped periphery which is flattened on one side engaging said bore to provide for a three-point engagement of said tooth holders in said bores.

4. A milling cutter as set forth in claim 2, in which said attachments are of U-shape and each of them is formed with two limbs engaging the respective supporting means, said supporting means and said limbs being formed with through bores aligned in a direction transverse to said supporting face, and said fixing means associated with each attachment comprising a fixing bolt screw-connected to the cutter head and extending through said aligned bores, angularly adjustable eccentric means provided on said bolt on opposite sides of said supporting means and attachment, and a steel strip applied over and across said tooth and attachment and having side portions mounted on said eccentric means.

5. A milling cutter as set forth in claim 2, in which said attachments are of U-shape and slidably mounted in a straddling position on said supporting means.

6. A milling cutter as set forth in claim 2, in which said attachments are formed with limbs and the supporting means are formed with recesses receiving said limbs.

7. A milling cutter as set forth in claim 1, which comprises means fixing said tooth holders in said bores in the cutter head and means detachably fixing each tooth on the supporting face of the respective tool holder without affecting the fixation of said tooth holders in said bores.

8. A milling cutter as set forth in claim 1, which comprises shims replaceably inserted between the inner ends of the teeth and the abutting faces of the tooth holders.

9. A milling cutter as set forth in claim 7, in which said means detachably fixing each tooth comprise a fixing bolt screw-connected to the cutter head and extending through the tooth holder, angularly adjustable eccentric means provided on said bolt on opposite sides of said tooth holder, and two holding disks mounted on said eccentric means and adapted to clamp said tooth down on said supporting face upon appropriate angular adjustment of said eccentric means.

10. A milling cutter as set forth in claim 9, in which said eccentric means are integral with the fixing bolt.

11. A milling cutter as set forth in claim 9, in which at least one of said holding disks is formed with a radial slot.

12. A milling cutter as set forth in claim 9, which comprises a steel strip applied across each of said teeth and being formed with said holding disks as parts having a larger thickness than the rest of the strip.

13. A milling cutter as set forth in claim 12, which comprises side supports each of which engages one of said teeth on one side thereof and bears against the end face of the respective bore of the cutter head.

14. A milling cutter as set forth in claim 12, in which two teeth are arranged side by side on said supporting face and jointly held down by a common steel strip and a spacer is arranged between the two teeth.

15. A milling cutter as set forth in claim 1, which comprises wedges fixing said tooth holders in said bores in the cutter head and means detachably fixing each tooth in its guide without affecting the fixation of said tooth holders in said bores, each of said tooth holders being formed with a tapered longitudinal slot and said wedges conforming to and being received in said tapered slots and operable to expand said tooth holders to fix them in said bores of the cutter head.

16. A milling cutter as set forth in claim 15, in which said cutter head is formed with additional bores intersecting said bores for the tooth holders and the wedges have the cross-sectional shape of a semicircle mounting a polygonal figure and are guided in said additional bores.

17. A milling cutter as set forth in claim 1, in which said tooth holders are formed with end faces with respect to which said abutting faces are normal and the axes of the bores of the cutter head differ from the direction of the axis of the cutter head.

References Cited in the file of this patent

UNITED STATES PATENTS

| | | |
|---|---|---|
| 104,055 | Munro | June 7, 1870 |
| 1,311,452 | Lovejoy | July 29, 1919 |
| 2,648,893 | Begle | Aug. 18, 1953 |
| 2,659,962 | Doerseln | Nov. 24, 1953 |
| 2,683,302 | Bader | July 13, 1954 |
| 2,689,394 | Bentjens | Sept. 21, 1954 |
| 2,751,663 | Leuzinger | June 26, 1956 |